United States Patent Office 3,777,007
Patented Dec. 4, 1973

3,777,007
ANTI-CAKING ADDITIVES FOR INORGANIC SALTS
Lawrence P. Gould, Syracuse, and Robert J. Hoffman, Clay, N.Y., assignors to Allied Chemical Corporation, New York, N.Y.
No Drawing. Filed Sept. 29, 1969, Ser. No. 862,028
Int. Cl. C01b 21/50; C01c 1/16, 1/26
U.S. Cl. 423—268      14 Claims

ABSTRACT OF THE DISCLOSURE

Mono- and di-saccharides in a finely divided state of about 200 mesh size and in very small amounts of the order of 0.05 to 0.50 weight percent, are effective anticaking agents when mixed with inorganic salts which are prone to caking. Inorganic salts such as sodium nitrite, ammonium bicarbonate and ammonium chloride, to which is added this minute quantity of a saccharide such as sucrose, lactose, maltose, dextrose, fructose, mannose and arabinose, remain free-flowing after prolonged storage at elevated temperatures. When dissolved in water, these compositions yield clear solutions having no sediment, no floating scum or foam.

BACKGROUND OF THE INVENTION

In the past, inorganic salts prone to caking were treated with anticaking additives such as: pyrogenic silica; silicates and the oxides of magnesium, aluminum and calcium; starch; wetting agents such as alkyl sulfonates and sulfosuccinates, and the like. These known anticaking agents have met with some success but they leave much to be desired. For instance, although compositions with siliceous agents and starch, often impart satisfactory anticaking properties to an inorganic salt, the salt composition when dissolved in water forms a hazy solution or leaves a sediment, due to the presence of the anticaking agent. Additionally, wetting agents such as the alkyl sulfosuccinates tend to impart an undesirable taste to the composition, rendering it objectionable for use in foods and medicines, and the sulfonates increase the foaming tendency of solutions. Carbohydrates have been used as anticaking agents in the prior art, but in higher concentrations. The use of a higher concentration of a saccharide adds to the bulk and cost of the anticaking composition. The non-caking compositions of this invention, in which only minute amounts of mono- and di-saccharides are used, overcome the disadvantages of the prior art compositions.

DETAILED DESCRIPTION AND THE PREFERRED EMBODIMENTS

According to the present invention, carbohydrates selected from the class of mono- and di-saccharides, having an average particulate size predominantly of less than 200 mesh, are admixed with an inorganic salt which is prone to caking in very small amounts, to produce a composition which remains free-flowing even after prolonged storage. The small amount of additive which provides a free-flowing composition is in the order of about from 0.05 to 0.50 and preferably 0.1–0.2 weight percent of the salt. Surprisingly, polysaccharides such as the starches are not as effective anticaking additives in these small amounts and additionally impart a haze to an aqueous solution of the dissolved salt.

The use of anticaking additives, to render "non-caking" characteristics to inorganic salts which are prone to cake, is not new. The present invention, however, makes available the use of very small amounts of mono- and di-saccharides, which are substantially as effective as the anticaking agents of the prior art and overcome the disadvantages of prior art compositions.

Mono- and di-saccharides such as sucrose, lactose, maltose, dextrose, fructose, mannose and arabinose, are operable in this invention. Although saccharides having a particle size of predominantly less than about 200 mesh give best results, saccharides of greater particle size, such as about 80 mesh size are also operable, but are not particularly preferred. Sucrose and glucose, because of their effectiveness, availability and low cost are preferred. Within the spirit of this invention is included mixtures of the above saccharides.

The compositions of this invention comprise an inorganic salt admixed with a small mesh size mono- or di-saccharide at concentrations of as little as 0.05 to 0.50 weight percent based on the weight of the finely divided inorganic salt. The effectiveness of such minute quantities of saccharide is indeed unexpected. Lesser concentrations of the anticaking additive tend to be less effective and higher concentrations of above 0.5 percent, although effective, increase the cost, add bulk of the salt composition without commensurate benefits.

Preferably, the inorganic salt to which the saccharide is to be added, is in a finely divided particulate state for best results. It is preferred that the inorganic salt be of a particle size generally less than about 10 mesh and preferably about 20 mesh size. Although inorganic salts having a mesh size larger than 10 mesh may be used in the composition of this invention, the non-caking properties of the composition become less effective as the mesh size of either the salt or the saccharide or both, increase. Accordingly, the use of larger mesh sizes reaches a point of impracticality.

The water-soluble inorganic salts adaptable to the composition of this invention include for instance, sodium nitrite and ammonium bicarbonate, which are useful in consumer applications such as in meat curing and baking, respectively, and ammonium chloride, used as a diuretic in medicine. It is an advantage that these salts be free-flowing and when dissolved in water, form a clear solution. The anticaking compositions of this invention exhibit these properties and additionally, for food and medicinal use, the mono- and di-saccharides are preferred over many of the presently used anticaking agents because of their physiological acceptability. Of course, the compositions of this invention may be used for other than food or medical use. For instance, a free-flowing ammonium chloride composition may be used for making dry cell batteries and sodium nitrite may be used in the making of dyes.

Example 1

The compositions in Tables I, II and III below were prepared by intimately admixing 100 grams of the particulate inorganic salt with either 50 mg. or 100 mg. of the particular saccharide as indicated in each case. "Hardness," as recorded in the tables, was determined by placing a quantity of the salt composition in a caking cell under approximately 5 p.s.i. pressure, subjecting the cell, while under pressure, to conditions as described under the heading "Caking Conditions" in the tables below, allowing it to cool for a few hours, releasing the pressure, removing the cake from the caking cell, and subjecting the treated cake to the pressure of a crusher. The pressure in grams required to crush the cake is recorded in the tables below as "Hardness."

In Table I are included compositions of anticaking agents of the prior art.

TABLE I.—SODIUM NITRITE COMPOSITIONS

| Sample | Caking conditions | Hardness (grams) |
|---|---|---|
| Control (no additives) | 63 hrs. at room temp | >3,000 |
| Dextrose (0.05%) | do | 0 |
| Glucose (0.05%) | do | 0 |
| Al₂O₃ (0.05%) | do | 1,185 |
| Sodium methylnaphthalenesulfonate (0.05%) | do | 0 |
| SiO₂ (0.05%) | do | 1,627 |

TABLE II.—AMMONIUM BICARBONATE COMPOSITIONS

| Sample | Caking conditions | Hardness (grams) |
|---|---|---|
| Control (no additives) | 2 hours at 150° C | >3,000 |
| Sucrose (0.10%) | do | 0 |
| Dextrose (0.10%) | do | 0 |

TABLE III.—AMMONIUM CHLORIDE COMPOSITIONS

| Sample | Caking conditions | Hardness (grams) |
|---|---|---|
| Control (no additives) | 2 hours at 50° C | 2,360 |
| Dextrose (0.10%) | do | 0 |
| Sucrose (0.10%) | do | 0 |

Ammonium bicarbonate decomposes slowly at ambient temperatures but does not cake readily when stored under conditions that the released carbon dioxide can escape. Under confined conditions, however, the salt quickly loses free-flowing characteristics. The following experiment, therefore, was conducted to illustrate the efficacy of the compositions of this invention under the latter conditions:

Example 2

Approximately 100 grams of ammonium bicarbonate, predominantly about 10 mesh, was placed in each of two 500 ml. flasks. One was retained as the control. 100 mg. of sucrose of predominantly less than 200 mesh size was added to the second flask and both were stoppered tightly and mounted on a wrist-action shaker. The physical condition of the salt was determined by intermittent operation of the shaker mechanism. It was found that the control sample was caked and immovable after 24 hours. The sample containing the sucrose remained essentially free-flowing after standing for 60 days.

Of all the tests completed, it was found that the mono- and di-saccharides were as effective or better than the prior art anticaking agents, and when dissolved in water, a clear solution with no sediment or foam resulted.

The following examples cover experiments which were conducted on large quantities of inorganic salts with and without a minute amount of a saccharide anticaking agent. Each batch was packaged in a closed drum or bag as indicated.

Example 3

(a) 300 pounds of ammonium bicarbonate were treated with 0.2 percent sucrose of predominantly −200 mesh size and thoroughly mixed in a rolling barrel and stored in a closed drum container. A control containing 300 pounds of ammonium bicarbonate was also stored in a closed drum container. Both containers were set aside for 10 weeks with no temperature or humidity control. The composition in the treated drum could be scooped up by hand. There was no noticeable caking. The untreated composition consisted of hard lumps and obvious caking.

(b) 100 pounds of ammonium bicarbonate were barrel mixed with 0.2 percent sucrose of predominantly −200 mesh and filled into a polyethylene lined bag. A second bag of 100 pounds of ammonium bicarbonate contained no sucrose. Both polyethylene lined bags were stored in a warehouse as above with no temperature and humidity control. The untreated bag was stiff when lifted and the product was caked and lumpy. The treated bag sagged in the middle when lifted and the product was granular to the touch, with no evidence of caking.

Example 4

(a) 400 pounds of sodium nitrite were treated with 0.2 percent sucrose of predominantly −200 mesh size and thoroughly mixed in a rolling barrel and placed in a closed fiberboard drum container. A control containing 400 pounds of sodium nitrite, without added sucrose, was also placed in a closed plain fiberboard drum container. Both containers were set aside for 9 weeks with no temperature or humidity control. The untreated composition was hard and could not be crushed by hand. The treated composition could be scooped out by hand and there was little evidence of caking.

(b) 400 pounds of sodium nitrite were treated with 0.2 percent sucrose of predominantly −200 mesh size and thoroughly mixed in a rolling barrel and placed in an aluminum lined drum. A control containing only 400 pounds of sodium nitrite was also placed in an aluminum lined drum. Both drums were set aside for 9 weeks with no temperature or humidity control. The untreated composition showed evidence of caking and the product could not be scooped out by hand. The treated composition could be scooped out by hand and showed no evidence of caking.

(c) 100 pounds of sodium nitrite were treated with 0.1 percent sucrose of predominantly −200 mesh size and thoroughly mixed in a mixing barrel and placed in a plain fiberboard drum. A control containing only 100 pounds of sodium nitrite was also placed in a plain fiberboard drum. Both were stored for 15 weeks with no temperature or humidity control. The untreated composition showed signs of caking and the treated composition showed no signs of caking and could be easily scooped out by hand.

(d) 100 pounds of sodium nitrite were treated with 0.1 percent sucrose of predominantly −200 mesh size and thoroughly mixed in a mixing barrel and placed in a polyethylene lined bag. A control containing only 100 pounds of sodium nitrite was placed in an identical bag and both bags were stored for 15 weeks with no temperature or humidity control. The untreated composition was hard because of heavy caking. The treated composition showed no signs of caking and could be easily scooped out by hand.

We claim:

1. A composition of matter comprising a mixture of a finely divided, water-soluble inorganic salt, normally prone to caking and selected from the group consisting of sodium nitrite, ammonium bicarbonate and ammonium chloride and from 0.05 to 0.5 percent by weight of said salt of an anticaking agent consisting solely of at least one saccharide selected from the group consisting of sucrose, lactose, maltose, dextrose, fructose, mannose and arabinose; said composition of matter being characterized as free-flowing and upon dissolution in an aqueous solution forms a clear solution.

2. The composition of claim 1 wherein the saccharide is present in an amount from 0.1 to 0.2% by weight of the salt.

3. A composition as in claim 1, wherein said inorganic salt is sodium nitrite.

4. A composition as in claim 3, wherein said sodium nitrite is of a particulate size of predominantly about 20 mesh.

5. A composition as in claim 1, wherein said inorganic salt is ammonium bicarbonate.

6. A composition as in claim 5, wherein said ammonium bicarbonate is of a particulate size of less than about 10 mesh.

7. A composition as in claim 1, wherein said inorganic salt is ammonium chloride.

8. A composition as in claim 7, wherein said ammonium chloride is of a particulate size of predominantly about 20 mesh.

9. The composition of claim 1, wherein said salt is sodium nitrite and said saccharide is sucrose.

10. The composition as in claim 1, wherein said salt is sodium nitrite and said saccharide is dextrose.

11. The composition as in claim 1, wherein said salt is ammonium bicarbonate and said saccharide is sucrose.

12. The composition as in claim 1, wherein said salt is ammonium bicarbonate and said saccharide is dextrose.

13. The composition as in claim 1, wherein said salt is ammonium chloride and said saccharide is sucrose.

14. The composition as in claim 1, wherein said salt is ammonium chloride and the saccharide is dextrose.

References Cited

UNITED STATES PATENTS

| | | | |
|---|---|---|---|
| 2,345,134 | 3/1944 | Lindsay et al. | 23—52 |
| 2,984,543 | 5/1961 | Smith et al. | 23—64 |
| 3,241,977 | 3/1966 | Mitchell et al. | 23—64 X |
| 913,887 | 2/1909 | Herme | 23—208 R |
| 2,145,417 | 1/1939 | Hall | 99—222 |

FOREIGN PATENTS

| | | | |
|---|---|---|---|
| 481,129 | 3/1938 | Great Britain | 23—100 |

MILTON WEISSMAN, Primary Examiner

U.S. Cl. X.R.

99—157; 424—166